(12) United States Patent
Nagao

(10) Patent No.: US 10,389,868 B2
(45) Date of Patent: Aug. 20, 2019

(54) DEVICE AUTHENTICATION SYSTEMS AND METHODS

(71) Applicant: Intertrust Technologies Corporation, Sunnyvale, CA (US)

(72) Inventor: Yutaka Nagao, Cupertino, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 0 days.

(21) Appl. No.: 16/010,073

(22) Filed: Jun. 15, 2018

(65) Prior Publication Data

US 2018/0367663 A1 Dec. 20, 2018

Related U.S. Application Data

(60) Provisional application No. 62/521,312, filed on Jun. 16, 2017.

(51) Int. Cl.
*H04M 1/725* (2006.01)
*H04B 1/3816* (2015.01)
(Continued)

(52) U.S. Cl.
CPC ...... *H04M 1/72577* (2013.01); *H04B 1/3816* (2013.01); *H04L 9/3247* (2013.01);
(Continued)

(58) Field of Classification Search
CPC ....... H04W 12/08; H04W 12/06; H04W 4/50; H04W 8/18; H04W 12/12; H04W 8/183;
(Continued)

(56) References Cited

U.S. PATENT DOCUMENTS 6,332,193 B1 * 12/2001 Glass ................. G06F 21/32
713/170
7,752,140 B1 * 7/2010 Xu ..................... G06F 21/121
705/59

(Continued)

OTHER PUBLICATIONS

International Search Report and Written Opinion dated Sep. 5, 2018 for related International Application No. PCT/US2018/037861, filed Jun. 15, 2018 (16 pages).

(Continued)

*Primary Examiner* — Daniel Lai
(74) *Attorney, Agent, or Firm* — Finnegan, Henderson, Farabow, Garrett & Dunner, LLP

(57) ABSTRACT

This disclosure relates to, among other things, systems and methods for authenticating a device with a network carrier using secure hardware and software systems. Embodiments disclosed herein may provide for a hybrid SIM implementation that uses both trusted software and hardware. A hybrid SIM implementation consistent with aspects of the disclosed embodiments may leverage a relatively small amount of trusted hardware in conjunction with secure software to perform SIM-related operations. In various embodiments, such a hybrid solution may provide a SIM implementation that is more secure than solutions implemented by software alone, while still relating retaining some of the benefits of software solutions including improved update flexibility and/or carrier portability.

15 Claims, 6 Drawing Sheets

(51) Int. Cl.
*H04L 9/32* (2006.01)
*H04W 12/04* (2009.01)
*H04W 12/06* (2009.01)
*H04W 8/18* (2009.01)
*H04W 4/50* (2018.01)

(52) U.S. Cl.
CPC ............. *H04W 4/50* (2018.02); *H04W 8/183* (2013.01); *H04W 12/04* (2013.01); *H04W 12/06* (2013.01)

(58) Field of Classification Search
CPC ....... H04W 12/00; H04W 12/04; H04W 4/00; G06F 15/177; G06F 21/121; G06F 21/105; G06F 2212/1052; G06F 12/0246; G06F 12/1408; G06F 21/31; G06F 12/1416; G06F 12/1425; G06F 12/1433; G06F 12/145; G06F 12/1458; G06F 12/1491; G06F 21/12; G06F 21/305; G06F 21/313; G06F 21/34; G06F 21/36; G06F 21/41; G06F 21/45; G06F 21/46; G06F 21/52; G06F 21/572; G06F 21/575; G06F 21/602; G06F 21/606; G06F 21/62; G06F 21/71; G06F 21/79; G06F 21/88; G06F 8/61; G06F 9/44; G06F 9/445; H04M 1/72577; H04B 1/3816; H04L 9/3247

See application file for complete search history.

(56) References Cited

U.S. PATENT DOCUMENTS

| | | | |
|---|---|---|---|
| 2008/0318550 A1* | 12/2008 | DeAtley | H04L 63/08 455/411 |
| 2010/0088751 A1* | 4/2010 | Ando | H04W 8/065 726/5 |
| 2013/0078949 A1* | 3/2013 | Pecen | H04L 63/101 455/411 |
| 2014/0031012 A1 | 1/2014 | Park et al. | |
| 2014/0149737 A1* | 5/2014 | Kulkarni | G06F 9/468 713/156 |
| 2014/0194103 A1* | 7/2014 | O'Donnell | H04L 41/082 455/418 |
| 2015/0052595 A1* | 2/2015 | Murphy | G06F 21/44 726/7 |
| 2016/0227471 A1* | 8/2016 | De Foy | H04W 48/18 |
| 2017/0142121 A1 | 5/2017 | Lee et al. | |

OTHER PUBLICATIONS

"Secure Mechanism to Achieve Remote Credential Provisioning for IoT devices", 3$^{rd}$ Generation Partnership Project (3GPP), 3gpp.org, XP051170467, vol. SA WG3, pp. 1-4 (Sep. 27-29, 2016).
"SGP.21 RSP Architecture", GSM Association, gsma.com, XP55436762, Version 2.1, pp. 1-94 (Feb. 27, 2017).

* cited by examiner

DEVICE AUTHENTICATION SYSTEMS AND METHODS

RELATED APPLICATIONS

This application claims the benefit of priority under 35 U.S.C. § 119(e) to U.S. Provisional Patent Application No. 62/521,312, filed Jun. 16, 2017, and entitled "HYBRID SOFTWARE AND HARDWARE SECRUITY SYSTEMS AND METHODS," the contents of which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for authenticating devices. More specifically, but not exclusively, the present disclosure relates to systems and methods for authenticating a device with a network carrier using secure hardware and software systems.

Mobile devices including, for example, mobile phones, tablets, and/or computers, may use specialized integrated circuits, which may be referred to as a subscriber identity module and/or subscriber identification module ("SIM"), to store certain identification and/or key information used in connection with authenticating subscribers of the devices with service provider networks. For example, a SIM card may securely store an international mobile subscriber identity ("IMSI") number and/or an associated authentication key, as well as other device information such as contact information, that may be used to identify and authenticate subscribers on a network. Including specialized hardware in mobile devices designed to interface with SIM cards, however, may be associated with certain drawbacks that may include challenges in accommodating the space required by the specialized device hardware and/or reduced user and/or network operator flexibility as SIM cards may be bound to a particular carrier.

Software-based SIM implementations may address some of these challenges. For example, software SIM implementations may not be bound to a particular carrier, and may further alleviate device space constraints associated with specialized SIM-interfacing hardware. Software SIM implementations, however, may introduce additional challenges relating to the security of sensitive functions and/or information used in various SIM operations.

Embodiments disclosed herein may provide for a hybrid SIM implementation that uses both trusted software and hardware. For example, a hybrid SIM implementation consistent with aspects of the disclosed embodiments may leverage a relatively small amount of trusted hardware in conjunction with secure software to perform SIM-related operations. In various embodiments, such a hybrid solution may provide a SIM implementation that is more secure than solutions implemented by software alone, while still retaining some of the benefits of software solutions including improved update flexibility and/or carrier portability.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
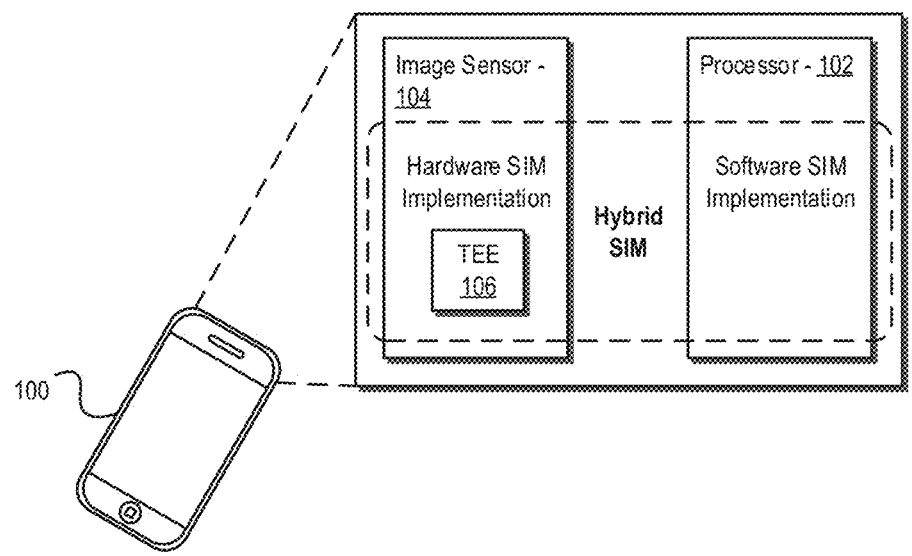
FIG. 1 illustrates a simplified diagram of a device that includes a hybrid SIM implementation consistent with certain embodiments of the present disclosure.

A description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may in some instances be designated by like numbers or descriptions. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Embodiments disclosed herein may provide for secure device authentication that may leverage a relatively small amount of trusted device hardware in conjunction with secure software to perform various authentication operations. By using a hybrid authentication implementation that uses both trusted software and hardware for SIM operations, a relatively secure and robust solution may be realized that retains some of the flexibility of software SIM implementations. For example, a hybrid SIM solution consistent with various aspects of the disclosed embodiments may provide improved updatability, carrier portability, and/or more flexible configuration.

Certain mobile devices may include trusted execution environments ("TEE") and/or secure processing units ("SPU") configured to perform sensitive operations such as trusted credential and/or key management, cryptographic operations, device authentication, secure policy management, and/or other aspects of the systems and methods disclosed herein. In some embodiments, a TEE and/or SPU may be protected from tampering by a user of the system and/or other entities by using secure physical and/or virtual security techniques. In certain embodiments, the TEE and/or SPU may operate in a logically secure processing domain and be configured to protect and operate on secret information, as described herein. In various embodiments, the TEE and/or SPU may include internal secure memory storing executable instructions, programs, and/or modules configured to enable the TEE and/or SPU to perform secure operations.

Some mobile devices may include dedicated processors that comprise TEEs and/or SPUs (e.g., a TrustZone within an ARM mobile processor). Dedicated processors that include TEEs and/or SPUs, however, may be relatively expensive and thus may be not be widely adopted in mobile devices.

While a mobile device may not necessarily include a dedicated TEE and/or SPU with significant capabilities, certain devices subsystems may include a relatively small amount of trusted hardware implementing relatively-limited IEEs and/or SPUs. For example, an image sensor included in a mobile device may include a TEE and/or SPU configured to implement certain limited sensitive functions such as biometric authentication (e.g., iris recognition). Such trusted hardware may further support various cryptographic functions such as, for example, advanced encryption standard ("AES") operations, error-correcting code operations, and/or digest functionalities such as shell archiving (e.g., shar).

Consistent with embodiments of the disclosed systems and methods, device components including trusted hardware providing relatively-limited IEEs and/or SPUs may be used in connection with implementing certain more secure aspects of SIM-related operations, and software associated with the device may perform certain less secure aspects of SIM-related operations. By using a hybrid authentication implementation that uses both trusted software and secure hardware for SIM operations consistent with various aspects of the disclosed embodiments, a relatively secure, robust, and flexible solution for performing SIM operations may be realized.

FIG. 1 illustrates a simplified diagram of a device 100 that includes a hybrid SIM implementation consistent with certain embodiments of the present disclosure. In certain embodiments, the device 100 may comprise at least one of a smartphone, an electronic book, a smartwatch, a laptop computer system, a desktop computer system, a wearable personal electronic device, a tablet computer, and/or any other computing system and/or mobile device that may be used in connection with the disclosed systems and methods. In various embodiments, the device 100 may be configured to authenticate an associated subscriber with a wireless carrier network using SIM functionality.

As illustrated, the device 100 may comprise at least one processor 102. The processor 102 may be configured to implement a variety of device functions including, for example, executing applications, coordinating certain services, and/or the like. The processor 102 may not, however, include an SPU, a hardened and/or secure execution space, and/or a TEE with sufficient trusted and/or secure resources to implement certain more secure functions associated with subscriber authentication and SIM functionality.

A subsystem and/or component of the device 100, such as, for example, an image sensor system 104, may comprise limited trusted hardware 106 implementing a SPU, a hardened and/or secure execution space, and/or a TEE. In various embodiments, the trusted hardware 106 included in the image sensor system 104 may be configured to implement certain sensitive functions involving the image sensor system 104 such as biometric authentication. Although various embodiments are discussed in connection with trusted hardware 106 being included in an image sensor system 104, it will be appreciated that any other subsystem and/or component of the device 100 may include trusted hardware used in connection with various aspects of the disclosed embodiments.

Consistent with embodiments disclosed herein, a hybrid SIM implementation may be included in the device 100 that uses the trusted hardware 106 of the image sensor 104 to perform certain relatively sensitive and/or highly secure SIM operations, and software executing on the processor 102 of the device to perform relatively less sensitive and/or secure SIM operations. A hybrid SIM implementation consistent with various aspects of the disclosed embodiments may provide a relatively secure, robust, and flexible solution for performing SIM operations, leveraging the security of performing certain SIM operations using trusted hardware and the flexibility of performing certain SIM operations using software. In various embodiments, SIM operations performed using software may be protected using any suitable code protection and/or obfuscation technique or combination of techniques.

In various embodiments, certain relatively secure SIM operations performed using trusted hardware 106 of the image sensor 104 may include, for example, AES encryption and/or decryption operations, managing integrated circuit card identifiers ("ICCID"), international mobile subscriber identities ("IMSI"), and/or one or more authentication keys, highly secure parts of the cellular authentication and voice encryption ("CAVE") authentication protocol, and/or other relatively secure operations. In further embodiments, certain relatively less secure SIM operations performed using software executing on the processor 102 of the device 100 may include, for example, provisioning and/or updating of ICC-IDs, IMSIs, authentication keys, less secure parts of the CAVE protocol, and/or software updates.

In some embodiments, relatively secure operations performed using trusted hardware 106 of the image sensor 104 may include generating and/or updating secret shared data ("SSD") used in connection with a CAVE authentication protocol. In certain embodiments, various aspects of the CAVE protocol may be used to perform secure services associated with mobile station authentication, subscriber message encryption, and/or encryption key and/or subscriber voice privacy key generation within wireless equipment, and/or the like. In further embodiments, trusted hardware 106 may execute cryptographic algorithms in connection with the CAVE protocol for authentication of mobile subscriber devices 100 and/or for the generation of cryptographic variables to be used in a variety of other procedures.

To calculate SSD for use in connection with aspects of the CAVE authentication protocol, the trusted hardware 106 may use random shared secret data, a cryptographic key that may comprise a subscriber authentication key, and a value, which may be referred to as an ESN value, that may be based on device and/or subscription identifiers as inputs. A plurality of linear feedback shift registers may be initialized in the trusted hardware 106, loaded with certain input information that may include the authentication key, offsets may be applied, and the CAVE algorithm may execute on the registers over multiple rounds to generate new SSDs. The new SSDs may be validated prior to being stored for use in connection with CAVE authentication. For example, a network base station and a device 100 may exchange validation data sufficient to determine that shared SSD matches.

In certain embodiments, relatively secure operations performed using trusted hardware 106 of the image sensor 104 may further include calculating an authentication signature for use in connection with the CAVE authentication protocol. Authentication signatures may be used for verifying the authenticity of messages used to request various wireless network services and/or for verifying SSDs. To authenticate messages, a random challenge value may be selected by an authenticating entity and may be shared with the device 100. Results returned by network equipment may include check data that can be used to verify that the random challenge value used by the network equipment matches that used by the authenticating entity. For device challenges of network equipment, as may be performed during the verification of SSD, a device 100 may select a random challenge value and share the value with network equipment generating authentication signatures.

The trusted hardware 106 may use random shared secret data, challenge data, authentication data that may comprise at least part of a message to be authenticated, and a value, which may be referred to as an ESN value that may be based on device and/or subscription identifiers, as inputs. A plurality of linear feedback shift registers may be initialized in the trusted hardware 106, loaded with certain input information, offsets may be applied, and the CAVE algorithm may execute on the registers over multiple rounds to generate an authentication signature.

Figure 2:
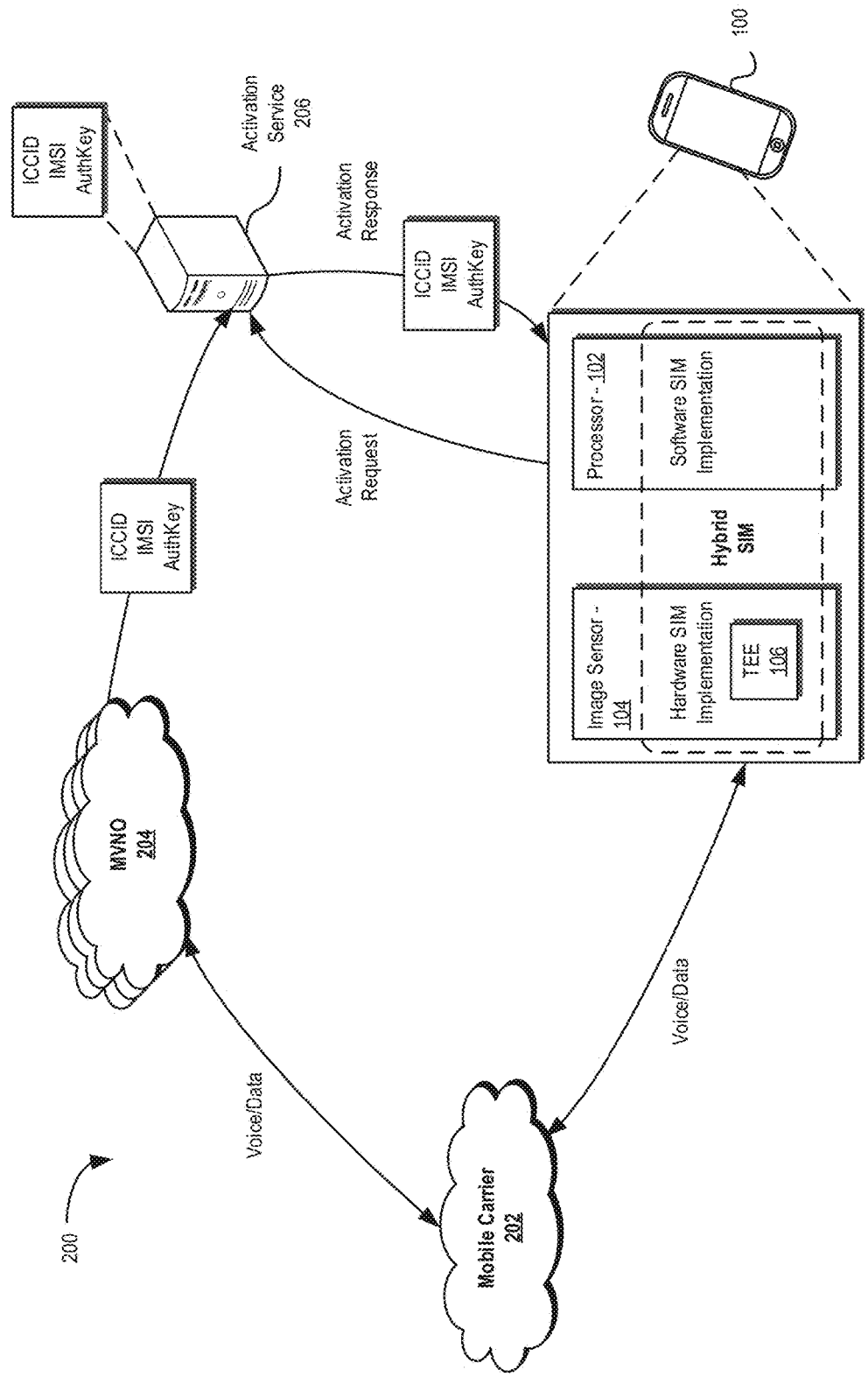
FIG. 2 illustrates an architecture of a hybrid SIM implementation consistent with certain embodiments of the present disclosure.

FIG. 2 illustrates an architecture 200 of a hybrid SIM implementation consistent with certain embodiments of the present disclosure. As discussed above, in certain embodiments, the device 100 may implement a hybrid SIM architecture that uses a relatively small amount of trusted hardware 106 included in the device image sensor 104 and/or another device subsystem and/or component to perform certain relatively sensitive and/or highly secure SIM operations, and software executing on the processor 102 of the device 100 to perform relatively less sensitive and/or secure SIM operations.

Consistent with various aspects of the disclosed embodiments, in connection with various SIM operations, the device 100 may interact with one or more mobile network operators and/or carriers 202, one or more mobile virtual network operators ("MVNOs") 204, and/or an authentication service 106. The illustrated operators and/or carriers 202, MVNOs 204, services 206, and/or devices 100 may comprise a variety of types of computing systems, combinations of systems, and/or other associated equipment (e.g., network infrastructure equipment and/or the like). For example, the mobile carrier 202, MVNOs 204, authentication service 206, device 100, and/or one or more other service providers (not shown) may comprise any suitable computing system and/or combination of systems configured to implement embodiments of the systems and methods disclosed herein. In certain embodiments, the mobile carrier 202, MVNOs 204, authentication service 206, device 100, and/or one or more other service providers may comprise at least one processor system configured to execute instructions stored on an associated non-transitory computer-readable storage medium.

The mobile carrier 202, MVNOs 204, authentication service 206, device 100, and/or one or more other service providers (not shown) may further comprise systems including a SPU and/or other TEE configured to perform sensitive operations such as trusted credential and/or key management, secure policy management, and/or other aspects of the systems and methods disclosed herein. For example, as described above, the device 100 may include an image sensor 104 that includes a relatively small amount of trusted hardware 106. The mobile carrier 202, MVNOs 204, authentication service 206, device 100, and/or one or more other service providers may further comprise software and/or hardware configured to enable electronic communication of information between the devices and/or systems via one or more associated network connections.

The mobile carrier 202, MVNOs 204, authentication service 206, device 100, and/or one or more other service providers may communicate using a network comprising any suitable number of networks and/or network connections. The network connections may comprise a variety of network communication devices and/or channels and may use any suitable communication protocols and/or standards facilitating communication between the connected devices and systems. For example, in some embodiments the network may comprise the Internet, a local area network, a virtual private network, and/or any other communication network utilizing one or more electronic communication technologies and/or standards (e.g., Ethernet and/or the like). In some embodiments, the network connections may comprise a wireless carrier system such as a personal communications system ("PCS"), and/or any other suitable communication system incorporating any suitable communication standards and/or protocols. In further embodiments, the network connections may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network connections may incorporate one or more satellite communication links. In yet further embodiments, the network connections may use IEEE's 802.11 standards, Bluetooth®, ultra-wide band ("UWB"), Zigbee, and or any other suitable communication protocol(s).

To activate a subscriber of the device 100 with the mobile carrier 202 and/or an MVNO 204, the device 100 may interact with an activation service 206. The activation service 206 be configured to, among other things, provision the device 100 with certain identifying information and/or information used in connection with device authentication and/or other cryptographic operations. For example, as illustrated, the device 100 may communicate an activation request to the activation service 206. In response, the activation service 206 may provision the device 100 with unique identification information and/or key information for use in connection with authenticating a subscriber of the device 100 with the mobile carrier 202 and/or an MVNO 204.

In certain embodiments, the information provisioned to the device 100 by the activation service 206 may comprise one and/or more of an ICCID, an IMSI, and/or a network authentication key. It will be appreciated that a variety of other types of identifying, authentication, and/or other information may be provisioned to the device 100 by the activation service 206 as part of a subscriber activation process. Information provisioned to the device 100 by the activation service 206 may, in certain instances, be generally referred to herein as activation information.

Activation information may be provided to the activation service 206 for provisioning to devices 100 by the mobile carrier 202 and/or the MVNO 204. In some embodiments, the mobile carrier 202 and/or the MVNO 204 may provide unique activation information assigned to a particular device 100 for provisioning to the device 100 by the activation service 206 during the activation process. In further embodiments, the mobile carrier 202 and/or the MVNO 204 may provide the activation service 206 with a plurality of unique sets of activation information. The activation service 206 may then provision a set of activation information from the plurality of unique sets to a particular device 100. In certain embodiments, as part of the activation process, the activation service 206 may identify the particular device 100 and/or subscriber that has been provisioned with a particular set of activation information, and may communicate and/or otherwise make available such associative information to the mobile carrier 202 and/or the MNVO 204.

In some embodiments, the activation service 206 may not be provided with activation information and/or portions thereof by the mobile carrier 202 and/or the MVNOs 204 for provisioning to devices 100, by may instead generate unique activation information for devices 100 for provisioning as part of the activation process. The activation service 206 may communicate to the mobile carrier 202 and/or the MVNOs 204 information associating devices 100 and/or subscribers and with activation information generated by the activation service 206 that has been provisioned to the devices 100 and/or subscribers. In this manner, the mobile carrier 202 and/or MVNOs 204 may be made aware of which devices 100 and/or subscribers were provisioned with which activation information, and may use such associations in connection with device 100 and/or subscriber authentication operations.

Although illustrated as separate entities, systems, and/or services, it will be appreciated that in further embodiments, various aspects of the disclosed embodiments performed by the mobile carrier 202, the MVNOs 204, and/or the activation service 206 may be performed by a single entity, system, and/or service and/or any suitable combination of entity, systems, and/or services.

Certain relatively secure activation information provisioned to the device 100 such as, for example, ICCIDs, IMSIs, and/or authentication keys, may be stored within the trusted hardware 106 and/or secure execution environment of the device's image sensor 104. Storing and/or otherwise managing this information within the protected environment of the trusted hardware 106 may provide increased security when compared to storing and/or managing the information in a less protected and/or secure software environment.

The provisioned activation information may be used by the device 100 in connection with authenticating the device 100 and/or an associated subscriber with a mobile carrier 202 and/or an MNVOs 204. For example, the device 100 may use the provisioned activation information in connection with a CAVE-based authentication protocol authentication process. Once the device 100 and/or subscriber have been authenticated with the mobile carrier and/or the MVNO 204, the device 100 may send and/or receive data and/or voice communications to/from the mobile carrier 202 and/or the MVNO 204.

In various embodiments, the activation service 206 may be configured to activate the device 100 for authentication with multiple mobile carriers 202 and/or MVNOs 204. For example, by interacting with the activation service 206, a user of the device 100 may activate their device with a first MVNO, later deactivate their device with the first MVNO by sending a deactivation request to the activation service 206 and engaging a deactivation process, and then reactivating their device with a second MVNO consistent with various embodiments disclosed herein. In this manner, the activation service 206 and use of the hybrid SIM implementation consistent with embodiments disclosed herein may provide for improved dynamic device configuration between multiple carriers.

In some embodiments, certain communication between the device 100, the activation service 206, the MVNOs 204, and/or the mobile carrier 202 may be encrypted and/or otherwise secure and/or protected. For example, in some embodiments, the activation information communicated from the activation service 206, the MVNOs 204, and/or the mobile carrier 202 may be encrypted. Certain communications of secure information within devices between various device subsystems (e.g., a hardware SIM component and a software SIM component of a hybrid SIM implementation) may be further protected using any suitable encryption and/or secure communication technique(s).

It will be appreciated that a number of variations can be made to the architecture, relationships, and examples presented in connection with FIG. 2 within the scope of the inventive body of work. For example, certain device, system, and/or service functionalities described above may be integrated into a single device, system, and/or service, and/or any suitable combination of devices, systems, and/or services in any suitable configuration. Thus, it will be appreciated that the architecture, relationships, and examples presented in connection with FIG. 2 are provided for purposes of illustration and explanation, and not limitation.

Figure 3:
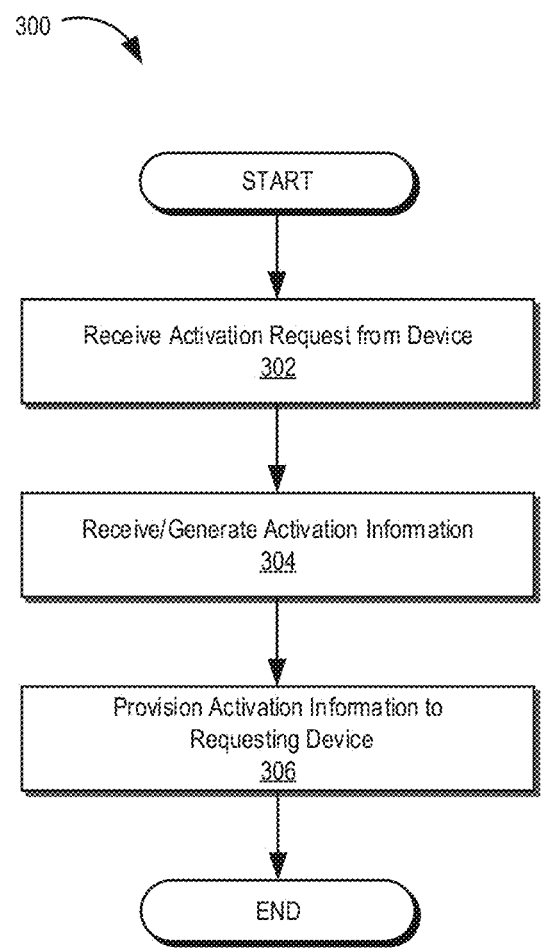
FIG. 3 illustrates a flow chart of an example of a method for provisioning a device consistent with certain embodiments of the present disclosure.

FIG. 3 illustrates a flow chart of an example of a method 300 for provisioning a device consistent with certain embodiments disclosed herein. The illustrated method 300 may be implemented in a variety of ways, including using software, firmware, hardware, and/or any combination thereof. In certain embodiments, various aspects of the method 300 and/or its constituent steps may be performed by an activation service, a mobile carrier, one or more MVNOs, and/or any other suitable system and/or services or combination of systems and/or services. In certain embodiments, the illustrated method 300 may facilitate the provisioning of a device with activation information as part of a subscriber activation process.

At 302, an activation service may receive an activation request from a device. In response, at 304, the activation service may access and/or generate activation information for provisioning to the device. In some embodiments, the activation information may comprise one or more of an ICCID, an IMSI, and/or an authentication key that may be used by the device to authenticate the device and/or an associated subscriber.

The activation information may be provided to the activation service by a mobile carrier and/or an MVNO for provisioning to the device. In certain embodiments, activation information provided to the activation service by the mobile carrier and/or MVNO may be associated with particular devices and/or subscribers. In further embodiments, the activation information provided to the activation service may not necessarily be associated with a particular device and/or subscriber. Upon provisioning such unassigned activation information, the activation service may assign and/or otherwise associate the activation information with a particular device and/or subscriber and communicate the assignment to the mobile carrier and/or the MVNO. In yet further embodiments, the activation service may generate the activation information for provisioning to devices, and may communicate the activation information generated by the activation service that has been provisioned to particular devices and/or subscribers to the mobile carrier and/or MVNO.

At 306, the activation service may communicate the activation information received and/or generated at 304 to the device. For example, the activation service may generate an activation response that comprises the activation information and communicate the activation response to the device. Certain relatively secure activation information provisioned to the device such as, for example, ICCIDs, IMSIs, and/or authentication keys, may be stored within trusted hardware and/or a secure execution environment included in a device subsystem (e.g., an image sensor) consistent with embodiments disclosed herein. Storing and/or otherwise managing this information within the protected environment of the trusted hardware may provide increased security when compared to storing and/or managing the information in a less protected and/or secure software environment.

Figure 4:
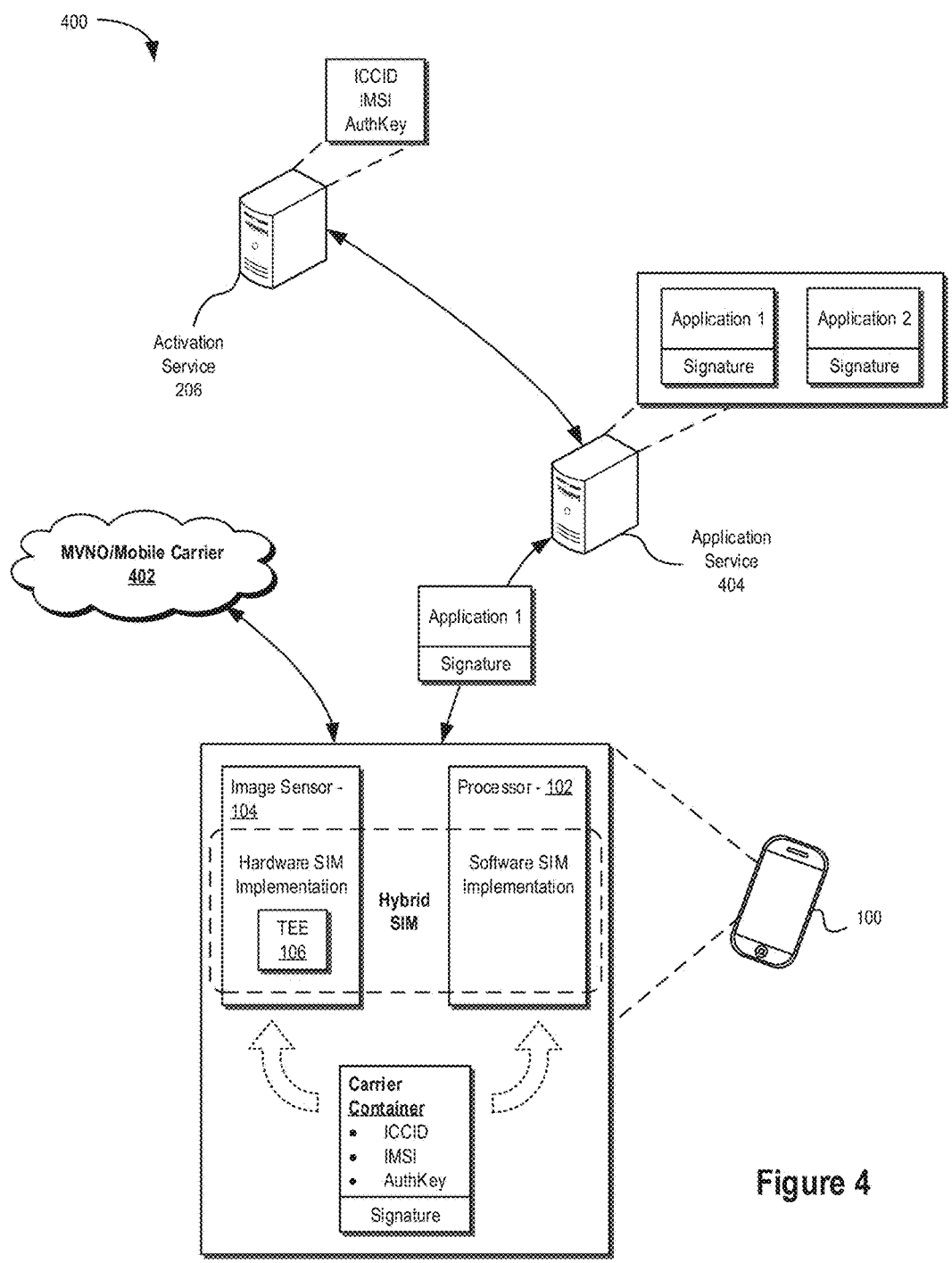
FIG. 4 illustrates another architecture of a hybrid SIM implementation consistent with certain embodiments of the present disclosure.

FIG. 4 illustrates another architecture 400 of a hybrid SIM implementation consistent with certain embodiments of the present disclosure. In various embodiments, an entity, such as an application service 404, may create one or more applications (e.g., "Application 1" and "Application 2"). When installed on a device 100, the applications may be capable of providing enhanced services when the device 100 is connected to a wireless communications network. For example, an application service 404 may wish to allow purchases and/or downloading of information using an application irrespective of whether the owner and/or user of the device 100 has separately subscribed to a mobile carrier service.

When an application is downloaded and installed on the device 100, the application and/or device 100 may engage in an application activation process. In some embodiments, the application may be electronically signed with a signature that is unique to the application and/or an entity associated with the application (e.g., an application creator, distributor, service and/or the like). As part of the application activation process, the application may interface with various SIM functionality included in the device 100 as part of a hybrid SIM implementation consistent with embodiments disclosed herein.

The device 100 may, in connection with the application activation process, engage in process with the application service 404 for activating the device 100 with a mobile carrier and/or MVNO 402. For example, the application may include information indicating a location and/or address of an activation service 206 and/or another entity (e.g., the application service 404 and/or the mobile carrier and/or MVNO 402) where the device 100 may issue activation requests for activating the device with a particular mobile carrier and/or MVNO 402. The device 100 may issue an activation request to the applicable service. In some embodiments, the activation request may include the electronic signature unique to the application and/or an entity associated with the application (e.g., the application creator, distributor, service and/or the like) and/or another associated identifier.

In response to the activation request, the device 100 may receive from the activation service 206, the application service 404, and/or the mobile carrier and/or MVNO 402 a carrier container that includes activation information that may be used to authenticate the device 100 with the mobile carrier and/or MVNO 402. As discussed above, the activation information may comprise one and/or more of an ICCID, an IMSI, an authentication key, and/or any other information that may be used to authenticate the device 100 with the mobile carrier and/or MVNO 402. In certain embodiments, the carrier container may be cryptographically associated with the electronic signature unique to the application and/or an entity associated with the application (e.g., an application creator, distributor, service and/or the like). In this manner, the information included in the carrier container may be securely associated with the application and/or the entity associated with the application.

As discussed above, consistent with embodiments disclosed herein, relatively secure activation information included in the carrier container such as, for example, ICCIDs, IMSIs, and/or authentication keys, may be stored within the trusted hardware 106 and/or secure execution environment of the device's image sensor 104. Storing and/or otherwise managing this information within the protected environment of the trusted hardware 106 may provide increased security when compared to storing and/or managing the information in a less protected and/or secure software environment.

When the installed and activated application executes on the device 100, the application may access certain services by connecting to a wireless communication network. Consistent with embodiments disclosed herein, the hybrid SIM implementation may identify the signature associated with the application, identify the carrier container associated with the unique signature, and may use the activation information included in the identified carrier container (e.g., the ICCID, IMSI, and/or authenticate key) to authenticate and connect the device 100 with the network of the associated mobile carrier and/or MVNO 402. The application executing on the device 100 may then use this authenticated network connection to interact with the mobile carrier and/or MVNO 402.

In certain embodiments, only an application that includes the same signature associated with a carrier container may use the activation information included in the associated carrier container. In this manner, an application provider may negotiate and establish service contracts directly with a mobile carrier and/or MVNO 402 independent of the user of the device 100. When the application is installed and activated on the device 100 (e.g., activated with a mobile carrier and/or MVNO 402), the application may subsequently use the received carrier container information to authenticate the device 100 and/or application with the mobile carrier and/or MVNO 402 independent of whether the device 100 has been provisioned with other activation information for authenticating itself with other wireless communication networks.

Allowing for application-specific mobile carrier and/or MVNO authentication in the manner described above provides a variety of benefits. For example, an application provider may negotiate and establish service contracts directly with a mobile carrier and/or MVNO 402 that optimizes the performance and/or experience of their applications. Thus, when a user installs and activates the application on their device 100, they may be assured that the application will provide any necessary and/or preferable network connectivity regardless of whether the user has an established service with another mobile carrier and/or MVNO 402.

Application-specific mobile carrier and/or MVNO authentication consistent with various disclosed embodiments may allow for an application to access network services than may be different than the services a user of a device 100 has subscribed to directly and/or access services that are tailored to the requirements of the application. For example, a user of a device 100 may have a relationship with a mobile carrier that provides voice and limited-data service (e.g., data download limitations, lower access bandwidth, and/or the like). Bandwidth and/or data-intensive applications like a video streaming, music streaming, and/or video/voice calling applications, however, may provide improved services when the applications are able to use higher bandwidth and/or unconstrained data services. Accordingly, consistent with various embodiments, application providers may establish relationships with a mobile carrier and/or MVNO 402 to provide such enhanced network services separate from any other device data services when users are executing the provider's applications on their devices 100. For example, a video streaming application, an electronic book application, and/or a video/voice calling application may provide users unlimited and/or otherwise free data service independent of any existing mobile carrier service.

In certain embodiments, multiple applications (e.g., "Application 1" and "Application 2") that are associated with the same signature may use a same carrier container that is securely associated with the signature in connection with authenticating access to a mobile carrier and/or MVNO network. In this manner, once a carrier container with a particular signature has been provisioned to a device 100 as part of a prior application activation process, other applications with the same signature (e.g., originating from the same entity) may use the same previously-provisioned carrier container information without needing to engage in another application activation process. Accordingly, an entity may offer multiple applications (e.g., video streaming applications, music streaming applications, etc.) to users, and may provision the devices with activation information that may allow the entity's applications executing on the devices to authenticate access to the mobile carrier and/or MVNO 402. For example, as illustrated, once the device 100 has installed and obtained via an application activation process the carrier container associated with the signature of "Application 1," the device 100 may install "Application 2" and use the same carrier container to authenticate the device 100 with the mobile carrier and/or MVNO 402 when executing "Application 2" as "Application 2" may share the same signature as "Application 1."

It will be appreciated that a number of variations can be made to the architecture, relationships, and examples presented in connection with FIG. 4 within the scope of the inventive body of work. For example, certain device, system, and/or service functionalities described above may be integrated into a single device, system, and/or service, and/or any suitable combination of devices, systems, and/or services in any suitable configuration. Thus, it will be appreciated that the architecture, relationships, and examples presented in connection with FIG. 4 are provided for purposes of illustration and explanation, and not limitation.

Figure 5:
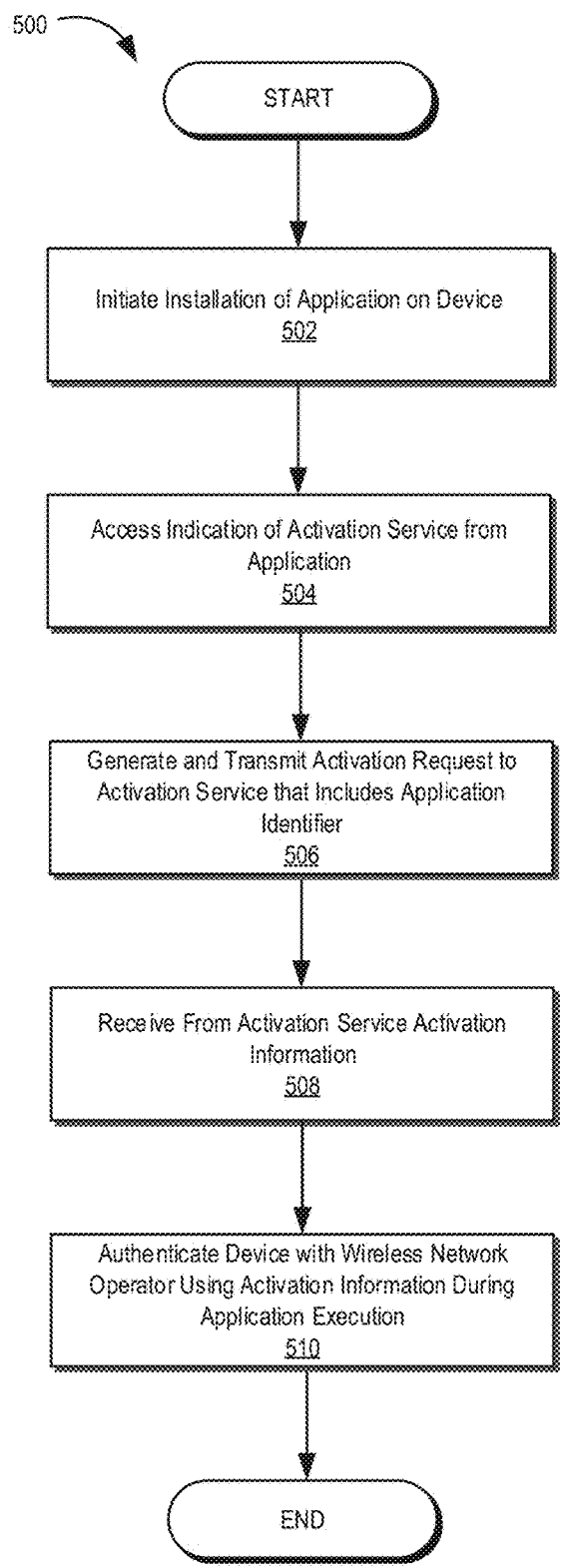
FIG. 5 illustrates a flow chart of an example of a method for authenticating a subscriber consistent with certain embodiments disclosed herein.

FIG. 5 illustrates a flow chart of an example of a method 500 for authenticating a subscriber consistent with certain embodiments disclosed herein. The illustrated method 500 may be implemented in a variety of ways, including using software, firmware, hardware, and/or any combination thereof. In certain embodiments, various aspects of the method 500 and/or its constituent steps may be performed by an activation service, an application service, a mobile carrier, one or more MVNOs, and/or any other suitable system and/or services or combination of systems and/or services. In certain embodiments, the illustrated method 500 may facilitate the provisioning of a device with activation information as part of an application activation process.

At 502, the installation of a first application may be initiated on the device. In some embodiments, the first application may be securely associated with a first electronic signature. In certain embodiments, the first electronic signature may be cryptographically associated with the first application. The first electronic signature may be associated with one and/or more of a creator of the first application, a distributor of the application, and/or an application service associated with the application (e.g., an application service that provisioned the first application to the device). In certain embodiments, the first application may comprise information indicating an associated activation service such as, for example, a location and/or an address of the activation service.

Upon installation, the first application may be activated with a wireless network operator, which may include a mobile network operator and/or a MVNO. As part of the application activation process, at 504, the indication of the activation service may be accessed from the first application. An activation request may be generated that comprises at least one identifier associated with the application and transmitted to the activation service identified by the application at 506. In certain embodiments, the at least one identifier associated with the application may comprise the first electronic signature. In some embodiments, the activation service may comprise a trusted service that is separate from the wireless network operator.

In response to the activation request, the device may receive activation information at 508. In certain embodiments, the activation information may be securely stored in trusted hardware included in a subsystem of the device. For example, the activation information may be securely stored and/or managed by a TEE included in an imaging sensor of the device as part of a hybrid SIM implementation consistent with various aspects of the disclosed embodiments.

The activation information may comprise one or more identifiers uniquely associated with the first application and/or the device and may include, for example, an ICCID and/or an IMSI. In further embodiments, the activation information may comprise at least one network authentication key. In certain embodiments, the activation information may be securely associated with the first electronic signature.

At 510, during execution of the first application by the device, the device may be authenticated with the wireless network operator using at least part of the activation information provisioned to the device by the activation service. In certain embodiments, the activation information may be used to authenticate the device as part of a SIM authentication process performed by a hybrid SIM implementation on the device consistent with embodiments disclosed herein.

In some embodiments, a second application may be installed on the device that is securely associated with a second electronic signature. The second application may be activated with the wireless network operator by identifying the stored activation information previously provisioned to the device during the activation process of the first application. In some embodiments, the stored activation information may be identified by determining that the first electronic signature associated with the activation information is the same as the second electronic signature associated with the second application. During execution of the second application, the device may be authenticated with the wireless network operator using at least part of the application information previously provisioned to the device by the activation service.

Figure 6:
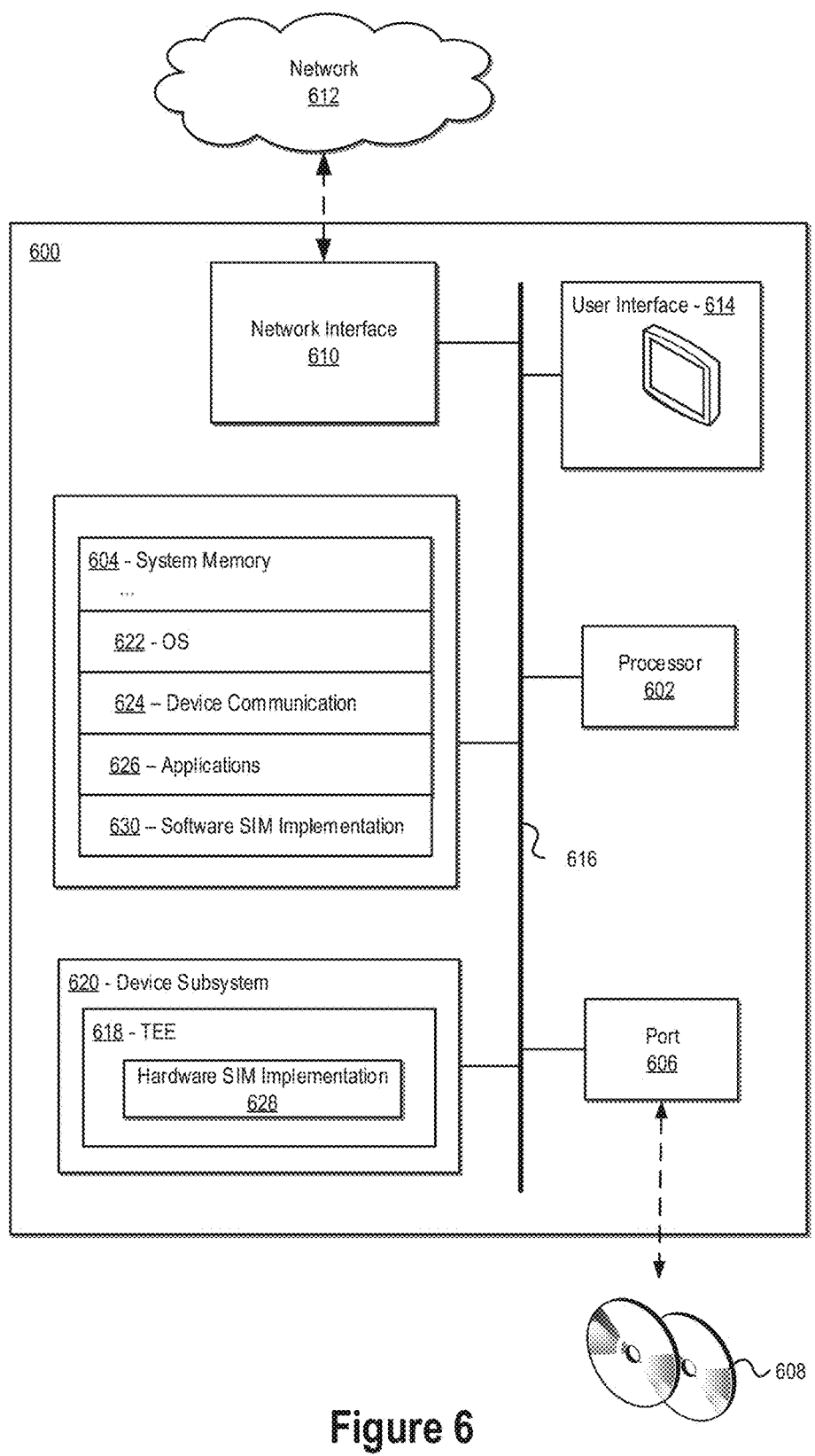
FIG. 6 illustrates an example of a system that may be used to implement certain embodiments of the systems and methods of the present disclosure.

FIG. 6 illustrates an example of a system 600 that may be used to implement certain embodiments of the systems and methods of the present disclosure. Certain elements associated with the illustrated system 600 may be included in a device, an activation service, an application service, an MVNO system, a mobile carrier system, and/or any other system or service configured to implement aspects of the embodiments of the systems and methods disclosed herein.

As illustrated in FIG. 6, the system may include: a processing unit 602; system memory 604, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 602; a port 606 for interfacing with removable memory 608 that may include one or more diskettes, optical storage mediums, and/or other non-transitory computer-readable storage mediums (e.g., flash memory, thumb drives, USB dongles, compact discs, DVDs, etc.); a network interface 610 for communicating with other systems via one or more network connections 612 using one or more communication technologies; a user interface 614 that may include a display and/or one or more input/output devices such as, for example, a touchscreen, a keyboard, a mouse, a track pad, and the like; and one or more busses 616 for communicatively coupling the elements of the system 600.

In some embodiments, the system 600 may include a TEE 618 that is protected from tampering by a user of the system or other entities by utilizing secure physical and/or virtual security techniques. In certain embodiments, the TEE 618 may be included in a device subsystem 620 separate from the processor 602 such as, for example, a device imaging system. The TEE 618 can help enhance the security of sensitive operations such as device and/or subscriber authentication with a wireless network operator and/or carrier, trusted credential and/or key management, privacy and policy management, and other aspects of the systems and methods disclosed herein. In certain embodiments, the TEE 618 may operate in a logically secure processing domain and be configured to protect and operate on secret information, as described herein. In some embodiments, the TEE 618 may include internal memory storing executable instructions or programs and/or other information configured to enable the TEE 618 to perform secure SIM operations, as described herein. For example, the TEE 618 may include trusted processing and/or storage resources configured to provide for a hardware component 628 of a hybrid SIM implementation consistent with the disclosed embodiments.

The operation of the system may be generally controlled by the processing unit 602 and/or the TEE 618 operating by executing software instructions and programs stored in the system memory 604 and/or internal memory of the TEE 618 (and/or other computer-readable media, such as removable memory). The system memory 604 may store a variety of executable programs or modules for controlling the operation of the system 600. For example, the system memory 604 may include an operating system ("OS") 622 that may manage and coordinate, at least in part, system hardware resources and provide for common services for execution of various applications 626.

The system memory 604 may further include, without limitation, communication software 624 configured to enable in part communication with and by the system; one or more applications 626; various information and/or executable modules associated with a software component 630 of a hybrid SIM implementation consistent with the disclosed embodiments; and/or any other information and/or applications configured to implement embodiments of the systems and methods disclosed herein.

The systems and methods disclosed herein are not inherently related to any particular computer, device, service, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, an optical storage medium, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims.

What is claimed is:

1. A method for authenticating a subscriber of a wireless network performed by a device comprising a processor and a non-transitory computer-readable medium storing instructions that, when executed by the processor, cause the device to perform the method, the method comprising:
   initiating installation of a first application on the device, the first application being securely associated with a first electronic signature;
   activating the first application with a wireless network operator, wherein activating the first application comprises:
   accessing an indication of an activation service from information included in the first application,
   transmitting an activation request to the activation service, the activation request comprising at least one identifier associated with the first application, and
   receiving, in response to the activation request from the activation service, activation information, and
   securely storing the activation information on the device; and executing the first application on the device, wherein executing the first application comprises authenticating the device with the wireless network operator using at least a portion of the activation information,
wherein the activation information is securely associated with the first electronic signature, and
wherein the method further comprises:
  initiating installation of a second application on the device, the second application being securely associated with a second electronic signature;
  activating the second application with the wireless network operator, wherein activating the second application comprises identifying the stored activation information by determining that the first electronic signature associated with the activation information is the same as the second electronic signature associated with the second application; and
  executing the second application on the device, wherein executing the second application comprises authenticating the device with the wireless network operator using the at least a portion of the activation information.

2. The method of claim 1, wherein the activation information is securely stored in trusted hardware included in a subsystem of the device.

3. The method of claim 2, wherein the subsystem of the device comprises an imaging sensor.

4. The method of claim 1, wherein the first electronic signature is cryptographically associated with the first application.

5. The method of claim 1, wherein the activation information comprises one or more identifiers associated with the device.

6. The method of claim 5, wherein the one or more identifiers associated with the device comprises at least one of an integrated circuit card identifier and an international mobile subscriber identity.

7. The method of claim 1, wherein the activation information comprises at least one network authentication key.

8. The method of claim 1, wherein the at least one identifier associated with the first application comprises the first electronic signature.

9. The method of claim 1, wherein the wireless network operator comprises a mobile network operator.

10. The method of claim 1, wherein the wireless network operator comprises a mobile virtual network operator.

11. The method of claim 1, wherein the activation service comprises a trusted service.

12. The method of claim 11, wherein the activation service comprises a trusted system that is separate from the wireless network operator.

13. The method of claim 1, wherein the first electronic signature is associated with at least one of a creator of the first application, a distributor of the application, or an application service.

14. The method of claim 1, wherein the method further comprises receiving the first application at the device from an application service.

15. The method of claim 1, wherein the indication of the activation service comprises at least one of a location of the activation service and an address of the activation service.

* * * * *